US006968203B2

(12) United States Patent
Lindell

(10) Patent No.: US 6,968,203 B2
(45) Date of Patent: Nov. 22, 2005

(54) DEVICE FOR MOBILE TERMINAL

(75) Inventor: Bo Lindell, Lidingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 721 days.

(21) Appl. No.: 09/983,850

(22) Filed: Oct. 26, 2001

(65) Prior Publication Data

US 2002/0068601 A1 Jun. 6, 2002

(30) Foreign Application Priority Data

Oct. 27, 2000 (SE) .................................. 0003952

(51) Int. Cl.[7] .................................. H04B 1/38
(52) U.S. Cl. .................................. 455/550.1; 455/575.1; 455/80
(58) Field of Search .................................. 455/426, 80, 552.1, 455/550, 575; 343/700, 702

(56) References Cited

U.S. PATENT DOCUMENTS

| | | | | |
|---|---|---|---|---|
| 4,721,962 | A | 1/1988 | Gorzel | |
| 5,220,334 | A | 6/1993 | Raguenet et al. | |
| 5,375,256 | A * | 12/1994 | Yokoyama et al. | 455/80 |
| 2002/0115436 | A1 * | 8/2002 | Howell et al. | 455/426 |
| 2003/0151556 | A1 * | 8/2003 | Cohen | 343/700 MS |

FOREIGN PATENT DOCUMENTS

| | | |
|---|---|---|
| EP | 0952625 A2 | 10/1999 |
| JP | 2000-183643 | 6/2000 |
| WO | WO97/41619 | 11/1997 |

OTHER PUBLICATIONS

Balanis: "Antenna theory analysis and design", pp. 566-571, John Wiley & Sons.
Arrl: "The Radio Amateur's Handbook 1967", p. 369.

* cited by examiner

*Primary Examiner*—Sonny Trinh
*Assistant Examiner*—Phuoc Doan
(74) *Attorney, Agent, or Firm*—Potomac Patent Group PLLC

(57) ABSTRACT

The invention relates to a mobile terminal antenna system for a first radio application (RA1) and a second radio application (RA2) the system comprising first radio electronic circuits (REC1) for the first radio application (RA1), and second radio electronic circuits (REC2) for the second radio application (RA2). The system also comprises an end-fed antenna (4) for the first radio application (RA1), the end-fed antenna (4) having an extended shape and being connected to the first radio electronic circuits (REC1). The system comprises a dipole antenna (5) for the second radio application (RA2), the dipole antenna (5) being located near one end of the end-fed antenna (4) and connected to the second radio electronic circuits (REC2). The first radio electronic circuits (REC1) are connected to the dipole antenna (5), whereby the end-fed antenna (4) is adapted to be fed, during transmission, against the dipole antenna (5) by the first radio electronic circuits (REC1), whereby the dipole antenna (5) is adapted to serve as a counterpoise for the end-fed antenna (4).

11 Claims, 4 Drawing Sheets

DEVICE FOR MOBILE TERMINAL

TECHNICAL FIELD OF THE INVENTION

The present invention refers to a mobile terminal antenna system according to the preamble of claim 1.

DESCRIPTION OF RELATED ART

In mobile terminal technology there is a requirement for the terminals to be as small as possible. Another requirement is for the antenna system to be equipped to use two or more widely separated frequency bands, whereby the effectiveness of the antenna is strongly linked to the dimensions of the latter. It is favorable to use an antenna having an electrical length in the region of a multiple of a half wavelength of the frequency to be used.

In addition to these requirements, some mobile terminals are designed to include a receiver for a satellite navigation system, such as the Global Positioning System (GPS). In the known art there are different solutions regarding the antenna system for such mobile terminals.

In the patent application WO97/41619, an antenna arrangement is disclosed, comprising one antenna for cellular communications, and another for GPS communications. A disadvantage with the antenna arrangement in WO97/41619 is that it requires a relatively large amount of space, and is therefore unpractical for mobile terminals, meeting size demands present today. There is also a risk for large coupling between the antennas, when these are located in the same housing, as in WO97/41619.

EP 0 952 625 A2 discloses an antenna arrangement comprising one antenna for more than one radio communication application. The antenna is formed by a conductive plate or layer, and two separate radio applications are accomplished by an adaptation of the shape of the plate or layer. A disadvantage with the antenna described in EP 0 952 625 A2 is that it is difficult to design and install, so that it is optimal in size for employing two or more resonances at frequencies used for communication between mobile terminals and base stations.

SUMMARY

It is an object of the present invention to provide a mobile terminal antenna system for two radio applications which facilitates the design of small terminals and is more effective and more cost effective than present mobile terminal antenna systems for more than one radio application.

It is also an object of the present invention to provide a mobile terminal antenna system for two radio applications which provides substantial isolation between the two radio applications.

The object is met by a mobile terminal antenna system, having the characterizing features of claim 1.

Thus, the dipole antenna according to the invention can, on one hand, be used in a balanced configuration for one radio application, and, on the other hand, be used in an unbalanced configuration for another radio application, as a counterpoise together with the separate end-fed antenna. Using one of the antennas for both radio applications has the merit of saving valuable space in the mobile terminal. Also, feeding the dipole antenna symmetrically in one radio application, and asymmetrically in another radio application provides for a substantial isolation between the two antenna ports.

Preferably, one of the radio applications is radio communication, in a cellular telephone network, using the end-fed antenna, the electrical length of which approximately corresponds to a full and a half wavelength of two respective frequencies, on which the end-fed antenna is intended to transmit or receive, and separate matching circuits, or filters, are provided for the respective frequency bands.

Preferably, the end-fed antenna extends through a major part of the mobile terminal casing, and is formed by the terminal chassis or the screening device for the radio electronic circuits. Alternatively, the casing itself forms an antenna. Whether the chassis, screening or casing is used, the effect is that essentially the full mechanical length of the terminal, i.e. as much as possible of the available space is used for the antenna. This has the result of presenting a larger antenna than in known terminals, which provides for a larger bandwidth. The fact that the bandwidth of a small antenna is limited by its size is explained by Balanis, "Antenna theory analysis and design", pages 566–571, John Wiley & Sons.

Preferably, the electrical length of the end-fed antenna is in the vicinity of a full or a half wavelength of a frequency, on which the end-fed antenna is intended to transmit or receive. The electrical length of an antenna is often slightly larger than the physical length of the latter, as explained, for example in "The Radio Amateur's Handbook 1967" by ARRL, page 369. Providing a full or a half wavelength antenna makes it possible to use a counterpoise with a lower self-capacitance, than what would have been the case for a quarter wavelength antenna. This means that the counterpoise can be small in size.

Further features, developments and advantages with the present invention are obtained in connection to the dependent claims, and are revealed in the description here below.

BRIEF DESCRIPTION OF THE DRAWINGS

The invention will now be described in greater detail, with the aid of the accompanying drawings, on which

DETAILED DESCRIPTION OF EMBODIMENTS

Figure 1:
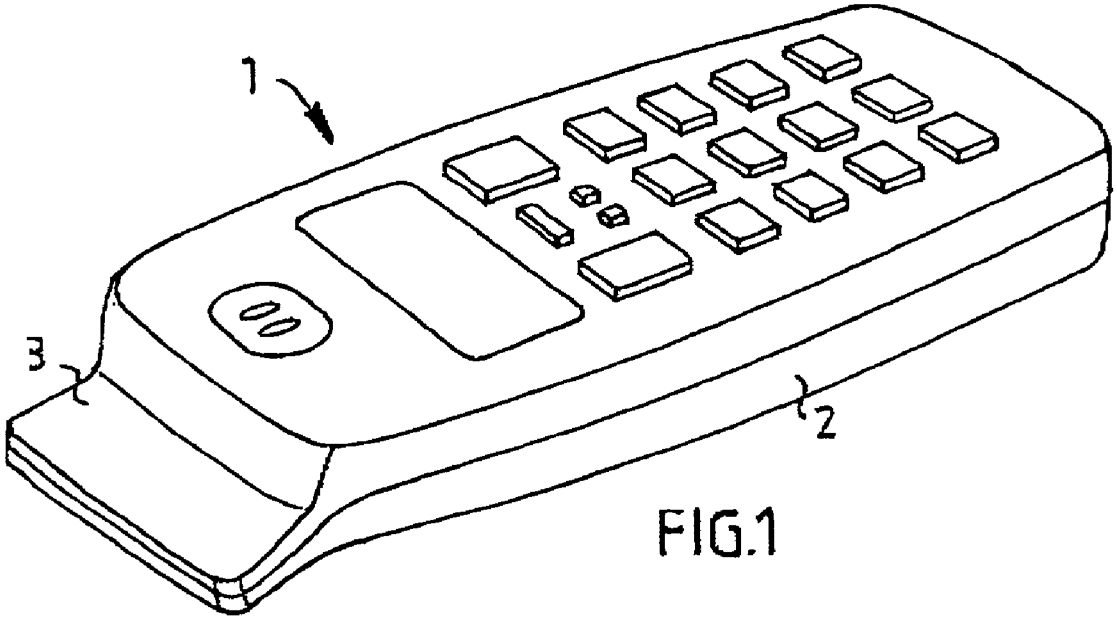
FIG. 1 shows a schematic perspective view of a mobile terminal, equipped with an antenna system according to a preferred embodiment of the present invention.

FIG. 1 shows a mobile terminal 1, equipped with an antenna arrangement according to a preferred embodiment of the present invention. The mobile terminal 1 comprises a main casing 2, having an extended shape. An antenna housing 3 is located at one end of the main casing 2. Alternatively, the mobile terminal 1 is not equipped with a separate antenna housing 3, rather all components of the antenna system are located within the main casing 2. Also, as will be described below, the casing 2 itself could form a part of the antenna system.

Figure 2:
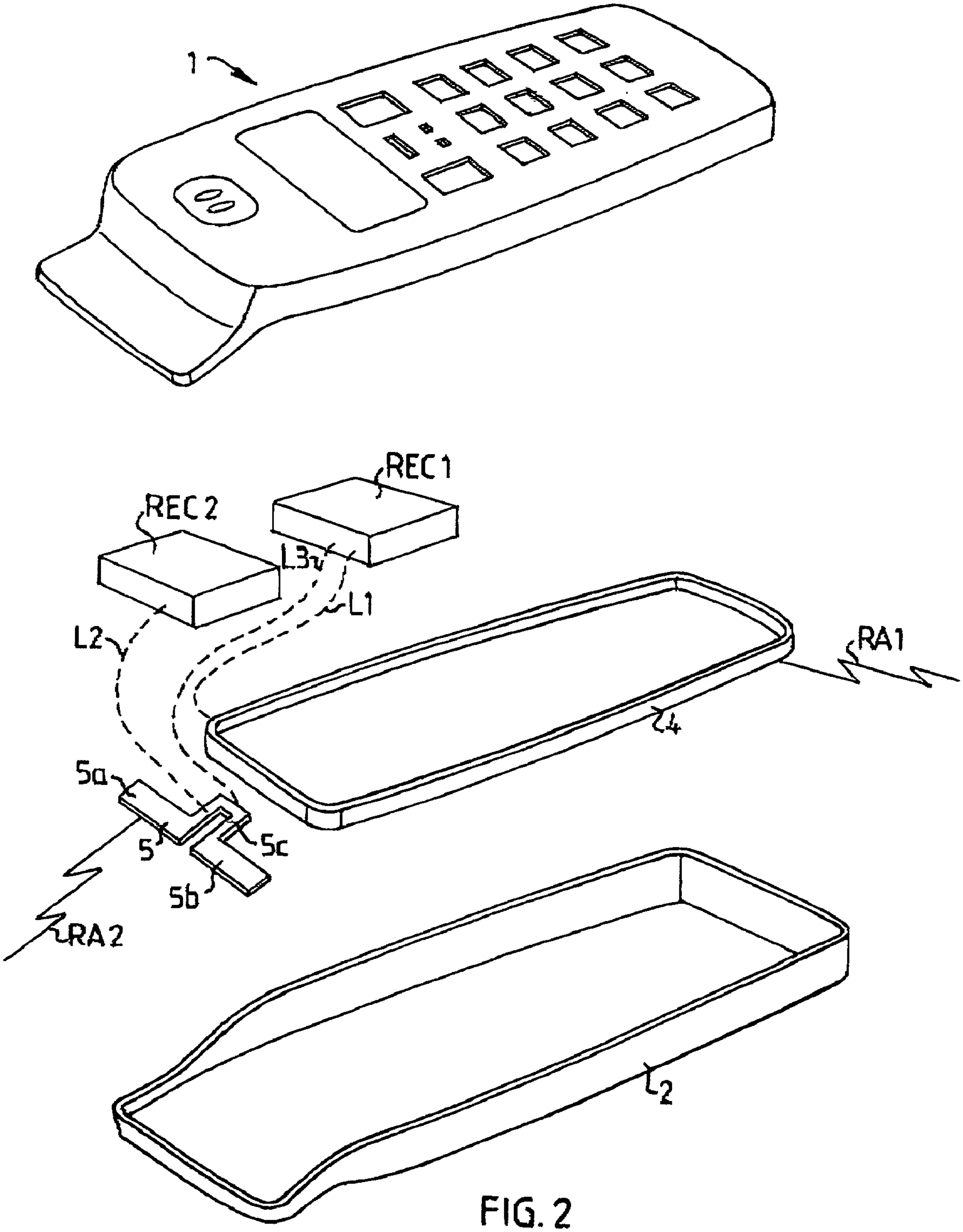
FIG. 2 shows a schematic exploded view of the mobile terminal from FIG. 1.

FIG. 2 shows an exploded view of the mobile teal 1 in FIG. 1. For a first radio application RA1, preferably communication between the mobile terminal 1 and a base station in a cellular telephone network, the mobile terminal 1 is provided with first radio electronic circuits REC1. The first radio electronic circuits REC1 are connected to an end-fed antenna 4, the connection being illustrated by the broken line L1. According to the preferred embodiment the end-fed antenna 4 is formed by a terminal chassis 4, having an extended shape and being located within the main casing 2 The terminal chassis 4 carries the internal components of the mobile terminal 1, and serves as a structural frame for the latter, as is known to persons skilled in the art.

In other embodiments the end-fed antenna 4 can be formed by the casing 2 or a screening device for the radio electronic circuits, as described in the co-pending application SE 0003951-1, filed the same day as the present application, by he same applicant, and hereby incorporated by reference in its entirety for all and any purposes.

Preferably the chassis 4 is adapted so that the electrical length of the latter corresponds approximately to the wavelength of the frequency, or frequencies, on which the antenna is intended to transmit or receive. Consequently, the electrical length of the chassis 4 in FIG. 2 approximately corresponds to half a wavelength at 900 MHz and a full wavelength at 1800 MHz, which are frequencies commonly used in mobile telephone communications. The relatively small length to width ratio of the chassis 4 makes it usable for a wide band antenna. Of course, the end-fed antenna 4 could be used for applications using one frequency only.

For a second radio application RA2, which could be a satellite navigation application or a short range radio application, such as blue-tooth, the mobile terminal 1 is provided with second radio electronic circuits REC2. In the case of the second radio application RA2 being a satellite navigation application the second radio electronic circuits REC2 would be a satellite navigation receiver. In the case of the second radio application RA2 being a short range radio application, such as blue-tooth, the second radio electronic circuits REC2 would be a transceiver, adapted for a short range radio application. The second radio electronic circuits REC2 are connected to a dipole antenna 5, the connection being illustrated by the broken line L2. The dipole antenna is located near one end of the end-fed antenna 4. In the preferred embodiment the dipole antenna 5 is formed by two strips 5*a*, 5*b* of a conductive material, such as metal, oriented in the transverse direction of the end-fed antenna 4. Preferably the two strips 5*a*, 5*b* are joined by a U-shaped element 5*c*, formed in a conductive material, whereby each end of the "U" is connected to one end of a respective strip 5*a*, 5*b*. Preferably the U-shaped element is located between the strips 5*a*, 5*b* and the end-fed antenna. Preferably the strips 5*a*, 5*b* and the U-shaped element 5*c* are formed integrally from the same work-piece. The strips 5*a*, 5*b* can present a flat, tube-like or any other suitable shape.

The dipole antenna 5 can be held in place in the mobile terminal 1 by means of a holder, not shown, secured on the chassis 4, the holder being made of an insulating material. Alternatively the dipole antenna 5 can be secured against any other suitable component of the mobile terminal 1, whereby the fastening means for the dipole antenna 5 is made out of a non-conductive material.

According to the invention, the dipole antenna 5 also serves as a counterpoise for the end-fed antenna 4. For this purpose the dipole antenna 5 is connected to the first radio electronic circuits REC1, the connection being illustrated by the broken line L3. During transmission in the first radio application RA1, the first radio electronic circuits REC1 functions as a transmitter, feeding the antenna system between the chassis 4 and the counterpoise 5. When receiving, the first radio electronic circuits REC1 works as a receiver, receiving a signal from the antenna system. In the first radio application RA1, the dipole antenna 5 serves as a low loss drain for the antenna current, or an artificial ground for the antenna system, and does not contribute itself, in any essential degree, to the radiated field, during transmission.

As described closer in the co-pending application SE 0003951-1 mentioned above, for the first radio application RA1, the geometry of the counterpoise element 5 is not critical. Therefore it can be formed to suite the purposes of a dipole antenna for the second radio application RA2, and still serve as a counterpoise for the end-fed antenna 4.

Figure 3:
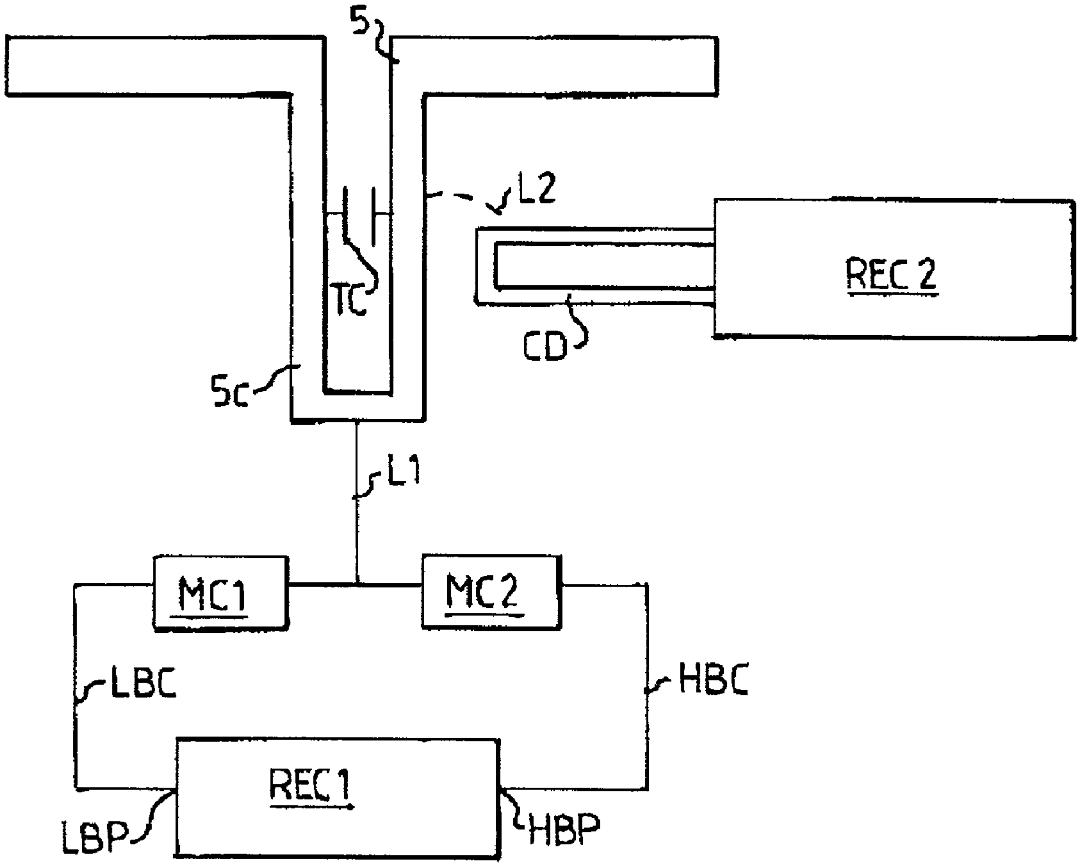
FIG. 3 shows schematically a part of the antenna system according to a preferred embodiment of the invention.

FIG. 3 shows the dipole antenna 5, and the second radio electronic circuits REC2, equipped with a coupling device CD, which in the satellite navigation application would form an inlet for signals from the dipole antenna 5. Located on the legs of the U-shaped element 5*c* is a component TC, adapted to form a tuning capacitance for the dipole antenna 5, whereby the dipole antenna 5 can be tuned to the frequency band of the second radio application RA2. Preferably the second radio electronic circuits REC2 are inductively connected to the dipole antenna 5, as illustrated by the broken line L2.

For cellular applications the first radio electronic circuits REC1 are connected to the dipole antenna 5, this being used as a counterpoise for the end-fed antenna as described above. Where two frequency bands ate used for cellular communications, preferably a low band connection LBC with a first matching circuit MC1 connects a low band port LBP of the first radio electronic circuits REC1 with the dipole antenna 5. A separate high band connection HBC with a second matching circuit MC2 connects a high band port HBP of the first radio electronic circuits REC1 with the dipole antenna 5. Of course, if only one frequency band is used in the first radio application RA1, only one matching circuit is needed.

Figure 4:
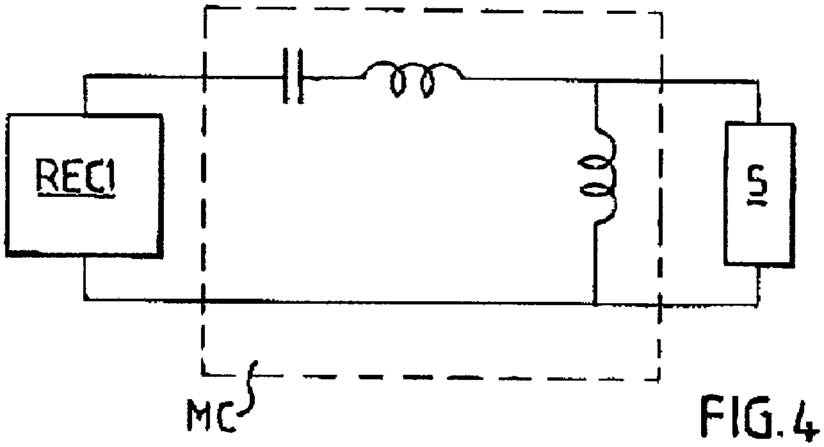
FIG. 4 shows a circuit with a matching circuit, according to an alternative embodiment of the present invention.

FIG. 4 shows an alternative arrangement for impedance matching of the antenna system for the first radio application RA1. Impedance matching is accomplished by a matching circuit MC, shown within broken lines in FIG. 4. The matching circuit MC is arranged for two resonances or bands, and is connected between the first radio electronic circuits REC1 and the counterpoise 5. For more than two bands, additional matching circuits can be connected in parallel to the counterpoise 5.

Figure 5:
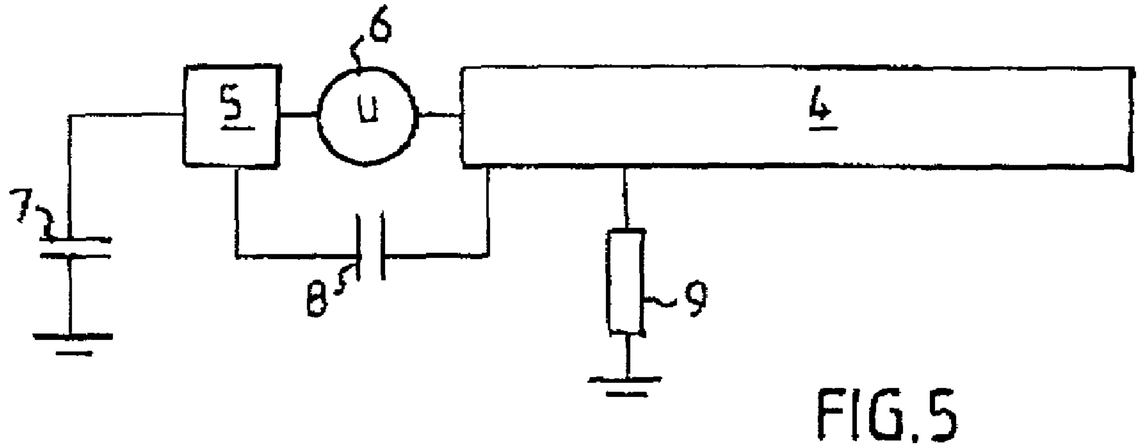
FIG. 5 shows schematically a part of the antenna system according to a preferred embodiment of the invention.

FIG. 5 shows schematically the antenna system for the first radio application RA1. The end-fed antenna 4 is fed by a power source 6, for example a transmitter. A counterpoise element 5, formed by the dipole antenna 5 as described above, is much smaller than the end-fed antenna 4, and is located at a distance from the end-fed antenna 4, the distance being in the order of the size of the counterpoise element 5. The counterpoise element 5 has a self-capacitance 7 and a shunt-capacitance 8 to the end-fed antenna 4. The end-fed antenna 4 has an impedance 9.

Figure 6:
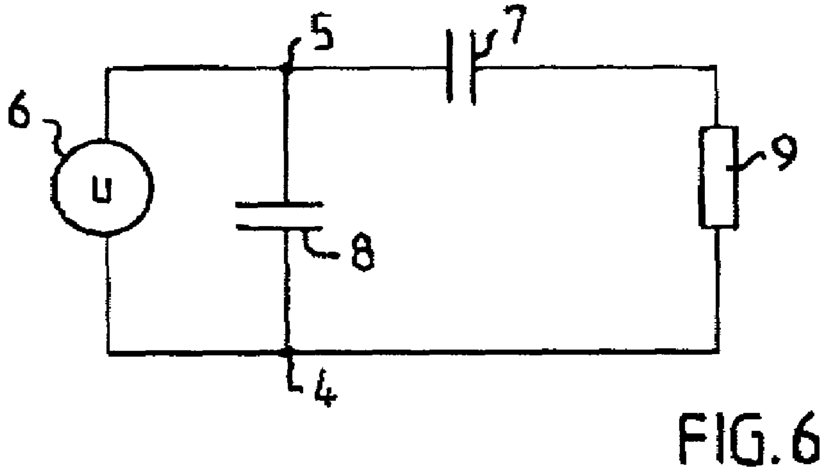
FIG. 6 shows a circuit being equivalent to the circuit in FIG. 5.

FIG. 6 shows a circuit being equivalent to the circuit in FIG. 5. The circuit in FIG. 6 shows that the impedance 9 of the end-fed antenna 4 is fed from the power source 6 in series with the self-capacitance 7 of the counterpoise element 5. The impedance of the end-fed antenna 4 is also shunted by the shunt-capacitance 8 between the counterpoise element 5 and the end-fed antenna.

The circuit in FIG. 6 indicates that, to achieve a good antenna performance in the first radio application RA1, the shunt-capacitance 8 should be small in relation to the self-capacitance 7. If the electrical length of the end-fed antenna is in the vicinity of a full or half wavelength of frequencies used in the first radio application RA1, the impedance of the end-fed antenna is higher than it would be at quarter wave resonances. This means that the self-capacitance 7 can be smaller at full or half wave resonances, than at quarter wave resonances.

The counterpoise element 5 is small in relation to the wavelength of frequencies to be used in communications between the mobile terminal 1 and a base station. During operation, to utilize as much as possible of the self-capacitance 7 of the counterpoise element 5, as large part as possible of the latter should have as high voltage as possible.

What is claimed is:

1. A mobile terminal antenna system for a first radio application and a second radio application, the system comprising:

first radio electronic circuits for the first radio application;

second radio electronic circuits for the second radio application;

an end-fed antenna for the first radio application, the end-fed antenna having an extended shape and being connected to the first radio electronic circuits; and a dipole antenna for the second radio application, the dipole antenna being located near one end of the end-fed antenna and connected to the second radio electronic circuits, wherein:

the first radio electronic circuits are connected to the dipole antenna, whereby the end-fed antenna is adapted to be fed, during transmission, against the dipole antenna by the first radio electronic circuits, whereby the dipole antenna is adapted to serve as a counterpoise for the end-fed antenna.

2. A mobile terminal antenna system according to claim 1, wherein the first radio application is radio communication in a cellular telephone network.

3. A mobile terminal antenna system according to claim 1, wherein the second radio application is a satellite navigation application, and the second radio electronic circuits are a satellite navigation system receiver.

4. A mobile terminal antenna system according to claim 1, wherein the second radio application is a short range radio application, and the second radio electronic circuits are a transceiver for a short range radio application.

5. A mobile terminal antenna system according to claim 1, wherein the end-fed antenna is located within and extends through a major part of a casing for the mobile terminal.

6. A mobile terminal antenna system according to claim 1, wherein the electrical length of the end-fed antenna approximately corresponds to a full and a half wavelength of two respective frequencies, on which the end-fed antenna is intended to transmit or receive.

7. A mobile terminal antenna system according to claim 1, wherein separate matching circuits are provided for the respective frequencies.

8. A mobile terminal antenna system according to claim 1, wherein the end-fed antenna forms a chassis.

9. A mobile terminal antenna system according to claim 1, wherein the end-fed antenna is formed by a screening device, which is adapted to protect the radio electronic circuits from external electromagnetic radiation.

10. A mobile terminal antenna system according to claim 1, wherein the end-fed antenna forms the casing, or a part thereof, for the mobile terminal.

11. A mobile terminal antenna system according to claim 1, wherein the dipole antenna is formed by two strips of a conductive material, such as metal, oriented in the transverse direction of the end-fed antenna, the two strips being joined by a U-shaped element, formed in a conductive material, whereby each end of the "U" is connected to one end of a respective strip.

* * * * *